Figure 10:
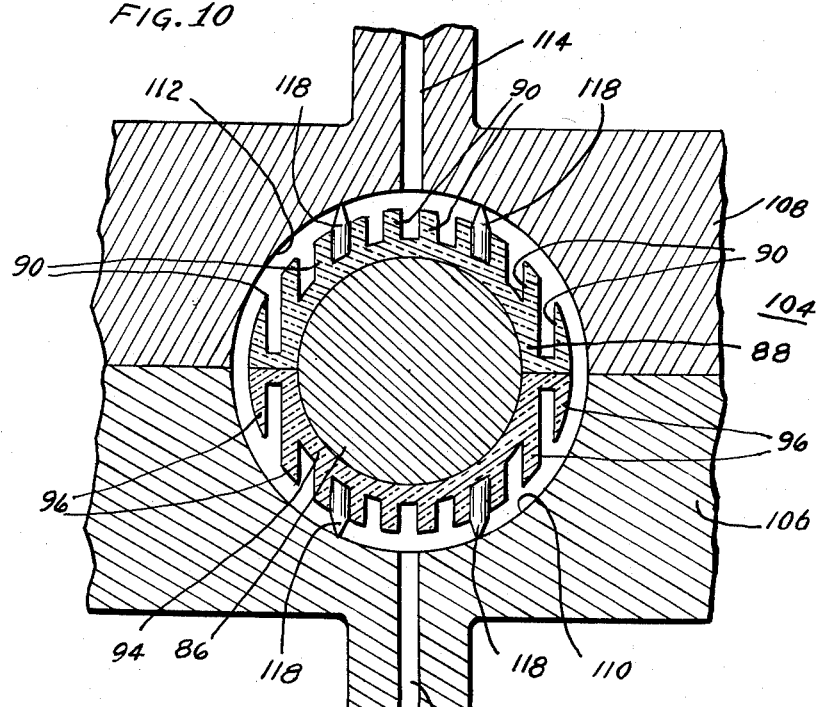

Jan. 4, 1966 J. P. GITS 3,227,000
MOLDED ARTICLES AND METHODS OF MAKING SAME
Filed Nov. 20, 1961 4 Sheets-Sheet 1
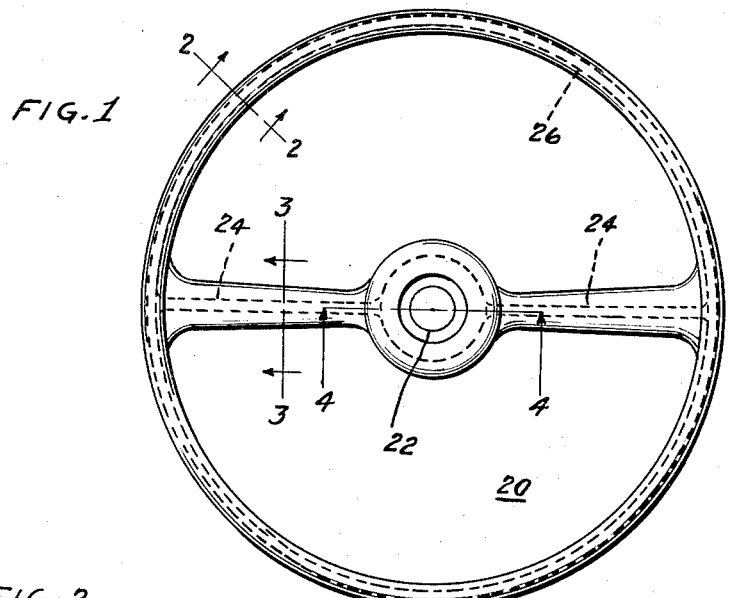
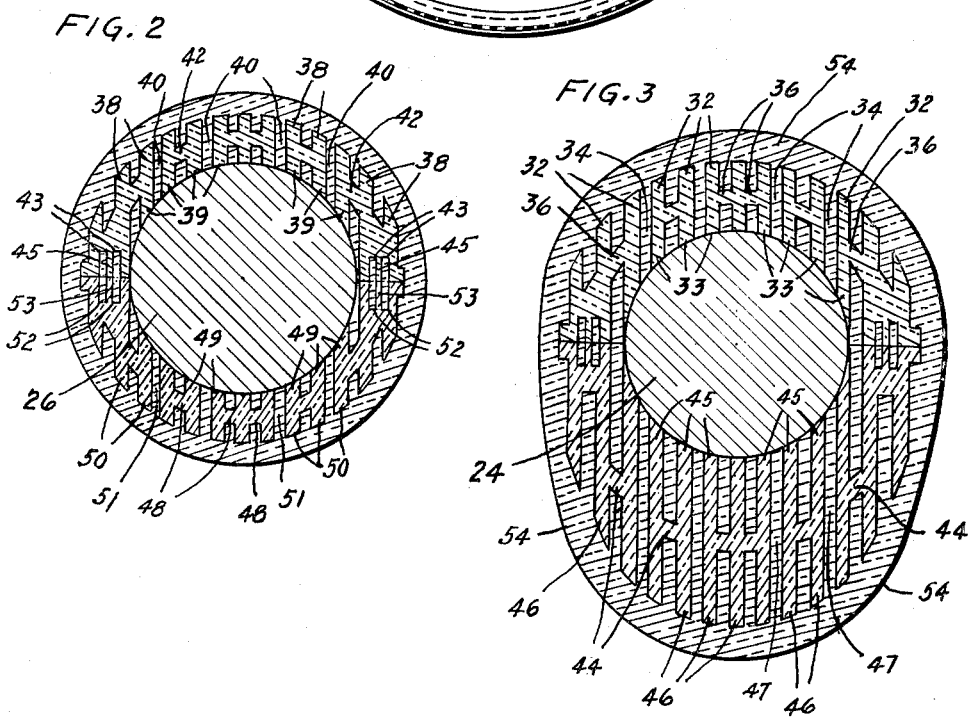
INVENTOR.
JULES PAUL GITS
BY
Rey Eilers
ATT'Y.

Jan. 4, 1966 J. P. GITS 3,227,000
MOLDED ARTICLES AND METHODS OF MAKING SAME
Filed Nov. 20, 1961 4 Sheets-Sheet 2
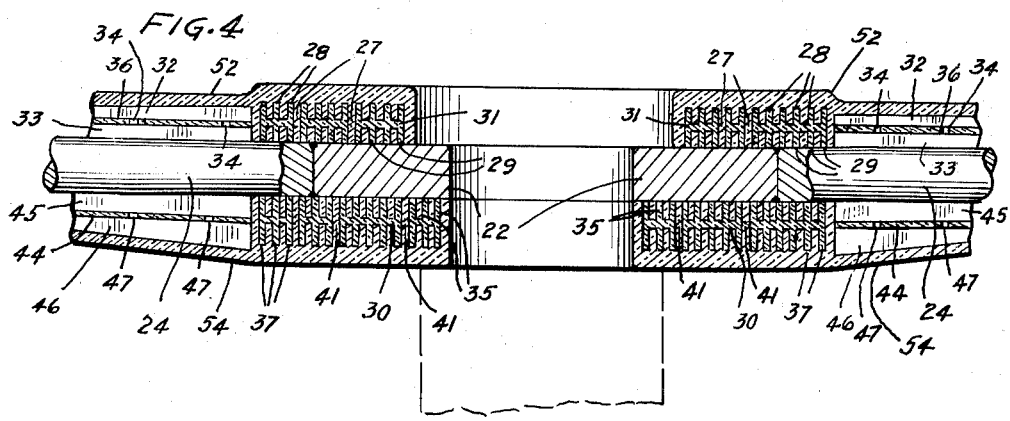
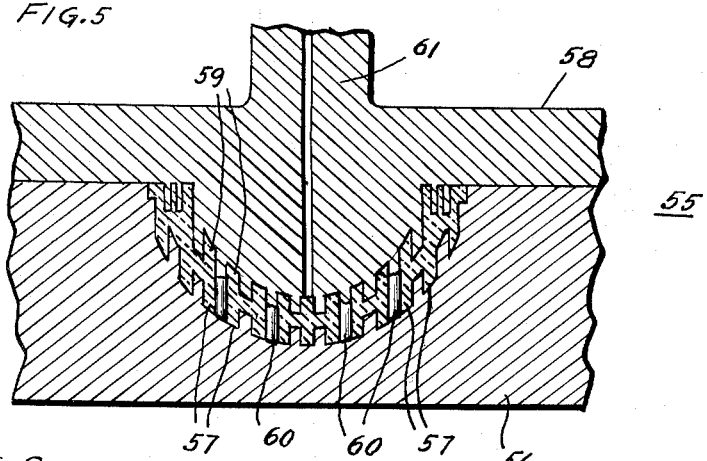
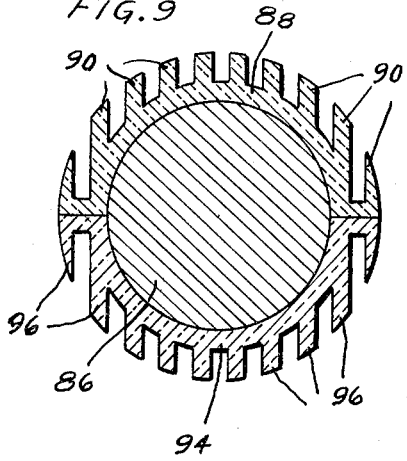
INVENTOR.
JULES PAUL GITS
BY
Rey Eilers
ATT'Y.

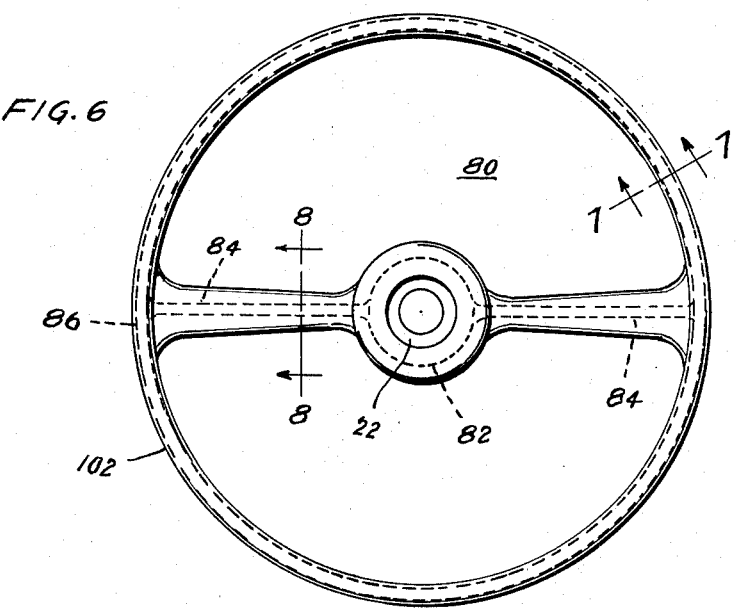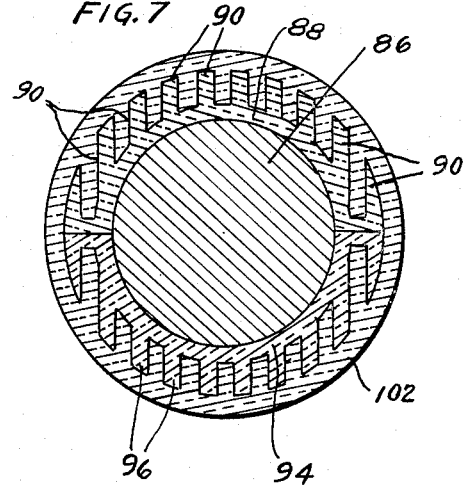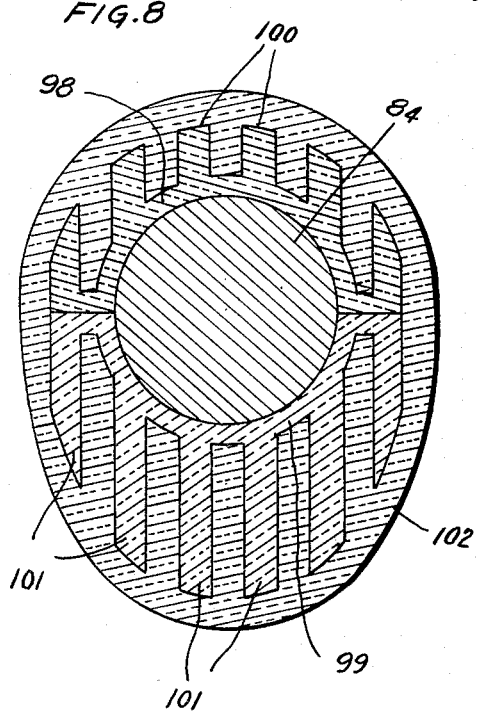

Jan. 4, 1966  J. P. GITS  3,227,000
MOLDED ARTICLES AND METHODS OF MAKING SAME
Filed Nov. 20, 1961  4 Sheets-Sheet 4

INVENTOR.
JULES PAUL GITS
BY
Rey Eilers
ATT'Y.

United States Patent Office 3,227,000
Patented Jan. 4, 1966

3,227,000
MOLDED ARTICLES AND METHODS OF
MAKING SAME
Jules Paul Gits, 1003 Lathrop Ave., River Forest, Ill.
Filed Nov. 20, 1961, Ser. No. 153,380
15 Claims. (Cl. 74—552)

This invention relates to improvements in molded articles and methods of making same. More particularly, this invention relates to improvements in molded articles in which metal cores are embedded and to methods of making such articles.

It is, therefore, an object of the present invention to provide an improved molded article in which a metal core is embedded and to methods of making that article.

It is frequently desirable to form molded articles with metal cores embedded within them; because the embedded cores provide strength for those articles while the plastic materials of those articles provide attractive appearances and a smooth "feel" for those articles. One molded article that is preferably made by embedding a metal core within a plastic body is a steeering wheel for an automobile; and, in recognition of this fact, many steering wheels for automobiles have been made which consisted of plastic bodies in which metal cores have been embedded.

Steering wheels, which consist of plastic bodies in which metal cores are embedded, are customarily made by placing a metal core in a mold and then injecting molten plastic into that mold to surround and embed that core. Steering wheels that are made in this manner tend to be unduly expensive because of the relatively high cost of the plastic material that is required and because of the relatively long time that is required for the plastic material to cool. In addition, steering wheels that are made in this manner can become distorted to some extent because of the tendency of the plastic material to shrink as it cools. The present invention avoids the relatively high cost, the long cooling time, and the distortion which have been associated with prior plastic steering wheels that have embedded metal cores; and it does so by utilizing a ribbed casing of relatively inexpensive plastic material for the metal core and by utilizing a high quality plastic material to encase that casing and its embedded metal core. The ribbed casing reduces the total amount of the high quality plastic material that is needed; and, in doing so, reduces the cost, the cooling time, and the total shrinkage of that high quality plastic material. It is, therefore, an object of the present invention to provide a steering wheel which has a metal core, a ribbed casing of plastic material for that core, and a mass of high quality plastic that encases that ribbed casing and its embedded core.

The steering wheel provided by the present invention is made by forming a "first shot" of relatively inexpensive plastic material; and that "first shot" has thin walls and elongated ribs. Preferably, that "first shot" is made as a plurality of parts which can be assembled together to define a recess for the metal core of the steering wheel. The thin walls and the elongated ribs of the "first shot" provide a large surface-to-volume ratio for that "first shot" and thereby reduce the cooling time of that "first shot". That "first shot" will be used to encase the metal core, and then a "second shot" will be forced into the spaces defined by the elongated ribs on the "first shot", and will also be caused to encase that "first shot" and its embedded metal core. The total amount of "second shot" that is needed will be relatively small; and that "second shot" will be able to solidify quickly. It is, therefore, an object of the present invention to provide a method of making a steering wheel with an embedded metal core that comprises forming a "first shot" of a plurality of parts which have thin walls and elongated ribs, using that "first shot" to encase that core, and subsequently filling the spaces between those ribs and encasing that "first shot" with a "second shot."

Other and further objects and advantages of the present invention should become apparent from an examination of the drawing and accompanying description.

In the drawing and accompanying description two preferred embodiments of the present invention are shown and described, but it is to be understood that the drawing and accompanying description are for the purpose of illustration only and do not limit the invention and that the invention will be defined by the appended claims.

In the drawing, FIG. 1 is a plan view of one embodiment of steering wheel that is made in accordance with the principles and teachings of the present invention, FIG. 2 is a sectional view, on a much larger scale, through the steering wheel of FIG. 1, and it is taken along the plane indicated by the line 2—2 in FIG. 1, FIG 3 is a further sectional view, on the scale of FIG. 2, through the steering wheel of FIG. 1, and it is taken along the plane indicated by the line 3—3 in FIG. 1, FIG. 4 is a still further sectional view through the steering wheel of FIG. 1, and it is taken along the plane indicated by the line 4—4 in FIG. 1, but it is on a smaller scale than FIG. 2, FIG. 5 is a fragmentary sectional view through a part of the "first shot" for the steering wheel of FIG. 1 and through a part of the mold for that part of that "first shot,"

Figure 11:
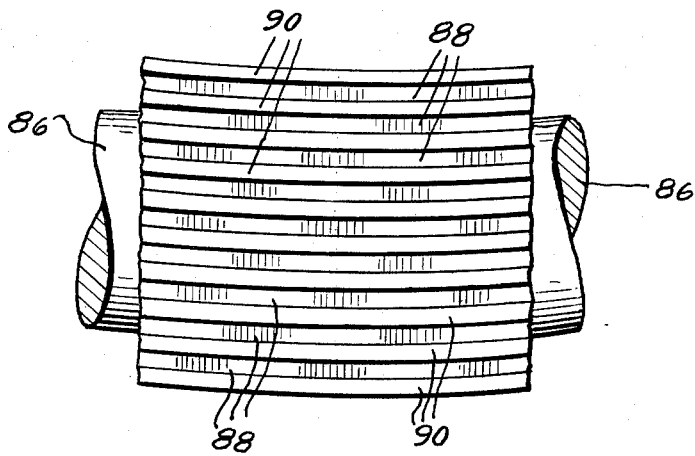

FIG. 6 is a plan view of another embodiment of steering wheel that is made in accordance with the principles and teachings of the present invention, FIG. 7 is a sectional view, on a much larger scale, through the steering wheel of FIG. 6, and it is taken along the plane indicated by the line 7—7 in FIG. 6, FIG. 8 is a further sectional view, on the scale of FIG. 7, through the steering wheel of FIG. 6, and it is taken along the plane indicated by the line 8—8 in FIG. 6, FIG. 9 is a fragmentary, sectional view through the "first shot" and the embedded core of the steering wheel of FIG. 6, FIG. 10 is a fragmentary, sectional view of the "first shot" and embedded core of FIG. 9, as that "first shot" and embedded core are mounted in the cavity of the mold in which the "second shot" will be applied, and FIG. 11 is a fragmentary, plan view of part of the "first shot" of the steering wheel of FIG. 6.

Referring to the drawing in detail, the numeral 20 generally denotes one embodiment of steering wheel that is made in accordance with the principles and teachings of the present invention. That steering wheel has a metal core which includes a hub 22, spokes 24 that project outwardly from that hub, and a rim 26 that is secured to the outer ends of those spokes. While that metal core could be made in a number of ways, it can be made by welding the spokes 24 to the hub 22 and by then welding the rim 26 to the spokes 24.

The "first shot" of the steering wheel 20 is preferably made in two halves; and each half has a hub portion, spoke portions, and a rim portion. The upper half of the "first shot" has a thin-walled hub portion 31 with elongated, substantially circular ribs 28 and 29 thereon. The ribs 28 project upwardly from the hub portion 31 and the ribs 29 project downwardly from that hub portion. The ribs 29 are formed to define recesses in the lower faces thereof which can accommodate the upper half of the hub 22 and the upper halves of the inner ends of the spokes 24. Openings 27 are formed in the thin-walled hub portion 31 intermediate adjacent ribs 28 or intermediate adjacent ribs 29. The upper half of the "first shot" has thin-walled spoke portions 36 with upwardly-extending ribs 32 and downwardly-extending ribs 33 thereon. The ribs 33 are formed to define recesses in the lower faces thereof which can accommodate the upper halves of the remaining portions of the spokes 24. Openings 34 are formed in the thin-walled spoke portions 36 intermediate adjacent ribs 32 or intermediate adjacent ribs 33. The upper half of the "first shot" has a thin-walled rim portion 42 with upwardly-extending ribs 38 and downwardly-extending ribs 39 thereon. The ribs 39 are formed to define recesses in the lower faces thereof which can accommodate the upper half of the rim 26. Openings 40 are formed in the thin-walled rim portion 42 intermediate adjacent ribs 38 or intermediate adjacent ribs 39. The ribs 38 and 39 on the thin-walled rim portion 42 are elongated and define large circles; and the ribs 32 and 33 on the thin walled spoke portions 36 are elongated and substantially straight. The rim portion 42 also has narrow recesses or grooves 43 in the lower face thereof, and those recesses are circular in plan. Those recesses are separated by a rib 45.

The thin walled hub portion 31, the thin walled spoke portions 36, and the thin walled rim portion 42 will preferably have wall thicknesses in the range of from forty-five thousandths to one-tenth of an inch; and the ribs 28, 29, 32, 33, 38 and 39 will preferably define grooves or recesses that are less than fifty thousandths of an inch in width. The lower half of the "first shot" is generally similar to the upper half of that "first shot." Thus, that lower half has a thin-walled hub portion 30 with upwardly-extending ribs 35 and with downwardly-extending ribs 37 thereon. Openings 41 are formed in the thin-walled hub portion 30 intermediate adjacent ribs 35 or intermediate adjacent ribs 37. The ribs 35 are formed to define recesses in the upper faces thereof which can accommodate the lower half of the hub 22 and the lower halves of the inner ends of the spokes 24. The lower half of the "first shot" has thin walled spoke portions 44 with upwardly extending ribs 45 and with downwardly-extending ribs 46 thereon. The ribs 45 are formed to define recesses in the upper faces thereof which can accommodate the lower halves of the remaining portions of the spokes 24. Openings 47 are formed in the thin-walled spoke portions 44 intermediate adjacent ribs 45 or intermediate adjacent ribs 46. The lower half of the "first shot" has a thin-walled rim portion 48 with upwardly-extending ribs 49 and with downwardly-extending ribs 50. The ribs 49 are formed to define recesses in the upper faces thereof which can accommodate the lower half of the rim 26. Openings 51 are formed in the thin-walled rim portion 48 intermediate adjacent ribs 49 or intermediate adjacent ribs 50. The ribs 49 and 50 on the thin-walled rim portion 48 are elongated and define large circles; and the ribs 45 and 46 on the thin-walled spoke portions 44 are elongated and substantially straight. The rim portion 48 also has narrow recesses or grooves 52 in the upper face thereof, and those recesses are circular in plan. Those recesses are separated by a rib 53.

The thin-walled hub portion 30, the thin-walled spoke portions 44, and the thin-walled rim portion 48 will preferably have wall thicknesses in the range of from forty-five thousandths to one-tenth of an inch; and the ribs 35, 37, 45, 46, 49 and 50 will preferably define grooves or recesses that are less than fifty thousandths of an inch in width.

Because the thin-walled portions of the upper half and the lower half of the "first shot" are so thin, and because the ribs on those thin-walled portions are even thinner, those halves will have large surface-to-volume ratios. Such surface-to-volume ratios are desirable because they enable the halves of the "first shot" to harden promptly in the molds in which they are formed.

The upper half of the "first shot" differs from the lower half of that "first shot" in having a larger central opening in the hub portion thereof. That larger opening permits a washer to directly engage the metal hub 22 and permits a nut to abut the upper face of that washer.

Each half of the "first shot" will be formed individually, and then the two halves will be placed in a cavity in a mold. The abutting edges of the ribs of these two halves of the "first shot" will be heated until they are at least "tacky," and then the metal core will be placed within the recesses defined by the ribs 29 and 35, the ribs 33 and 45, and the ribs 39 and 49. At such time, the "tacky" abutting edges of the ribs of the two halves of the "first shot" will be forced into engagement with each other to fixedly hold those halves in assembled relation with each other and with the metal core encased therebetween.

Once this has been done, the "second shot" 54 can be introduced into that mold. That "second shot" will initially engage the outer faces of the ribs 28, 37, 32, 46, 38 and 50 and will then fill the grooves or recesses between those ribs. Thereafter that "second shot" will pass inwardly through the openings 27, 41, 34, 47, 40 and 51 to engage the hub 22, the spokes 24 and the rim 26 of the metal core and to fill the grooves or recesses between the ribs 29, 35, 33, 45, 39 and 49, and to fill the recesses 43 and 52. The "second shot" 54 will intimately engage the metal core and will also intimately engage the thin-walled portions and the ribs of the upper and lower halves of the "first shot." In addition, that "second shot" will provide a finished, smooth surface for the steering wheel.

The "first shot" with its encased metal core will be held away from the walls of the cavity in the mold by pins that will be retracted after the "second shot" has filled the cavity but before that "second shot" has hardened or by studs of thermoplastic material that extend between the "first shot" and the cavity walls. As a result, the "second shot" 54 will be able to completely encase the "first shot" and its encased metal core. Those studs will preferably be made of the same material and will have the same color as the "second shot," and those studs will preferably be made with sufficiently small cross sections to merge with the "second shot" and thereby not interfere with the uniform and pleasing appearance of that "second shot." In designing the mold in which the "second shot" will encase the "first shot" and its encased metal core, the injection jet runners should be located so the pressure of the injected "second shot" will help hold the "first shot" and its encased metal core away from the walls of the cavity.

The "first shot" could be made of a high density, reclaimed polyethylene or other relatively inexpensive thermoplastic material. The "second shot" will preferably be made of a high quality butyrate material and will thus have a surface and "feel" that are pleasing.

The numeral 55 generally denotes part of the mold which is used to form the lower half of the "first shot." That mold has a matrix 56 with rib-defining grooves 57; and those grooves will define the ribs 50 of the rim portion of the lower half of the "first shot." The matrix 56 will have further grooves that will define the ribs 37 and 46, respectively, of the hub portion and spoke portions of that lower half of the "first shot." The mold 55 also has a patrix 58 which will coact with the matrix 56 to define the cavity in which the lower half of the "first shot" will be formed. The patrix 58 has grooves 59 defining the ribs 49 of the rim portion of the lower half of the "first shot," and it will have further grooves defining the ribs 35 and 45, respectively, of the hub and spoke portions of that lower half of the "first shot." The patrix 58 also has pins 60 that will define the openings 51 in the thin-walled rim portion. That patrix will have further pins that will define the openings 41 and 47, respectively, of the hub and spoke portions of that lower half of the "first shot." A gate 61 extends to the cavity defined by the matrix 56 and the patrix 58, and the molten material of the "first shot" will pass through that gate and be formed in the said cavity. Where desired, two or more cavities can be provided in the mold 55 so that both the upper and lower halves of the "first shot" can be formed simultaneously.

The portion of the "second shot" 54 which overlies the outer faces of the ribs on the thin-walled sections of the "first shot" will preferably be less than one eighth of an inch thick; because such a portion can harden quickly and yet can avoid surface distortion due to shrinkage. In one preferred embodiment of the present invention, the portion of the "second shot" 54 which overlies the outer faces of the ribs 28 and 37 is approximately one tenth of an inch thick, the portion of the "second shot" 54 which overlies the outer faces of the ribs is approximately one tenth of an inch thick, and the portion of the "second shot" 54 which overlies the outer faces of the ribs is approximately sixty thousandths of an inch thick; and the grooves or recesses defined by those various ribs are approximately thirty thousandths of an inch wide. With this arrangement, the "second shot" 54 can fill the grooves or recesses defined by the ribs on the halves of the "first shot" and can also provide a full and complete casing for the "first shot" and its encased metal core without requiring an undue time cycle and without surface distortion due to shrinkage.

It will be noted that many of the ribs on the two halves of the "first shot" extend substantially parallel to the direction in which the "second shot" material will flow. Thus, the ribs 32, 33, 45 and 46 of the spoke portions of the "first shot" define grooves or recesses which are substantially parallel to the spokes 24. Similarly, the ribs 38, 39, 49 and 50 of the rim portion of the upper and lower halves of the "first shot" define grooves or recesses which have generally the same radii of curvature as the rim 26. As a result, the "second shot" material 54 can rapidly move through the grooves or recesses and fill them.

Not only do the ribs on the upper and lower halves of the "first shot" reduce the total amount of "second shot" material 54 that is needed, but they also serve as elongated beams which can provide stiffness and strength for the finished steering wheel. The overall result is that the steering wheel 20 will have an attractive appearance and "feel" and will be sturdy and strong.

FIGS. 6–9 and 11 shows a second preferred embodiment of steering wheel that is made in accordance with the principles and teachings of the present invention. That steering wheel is denoted generally by the numeral 80, and it has a metal core which includes a hub 82, spokes 84 and a rim 86. The metal core for the steering wheel 80 can be identical to the metal core for the steering wheel 20. A "first shot" is provided for the steering wheel 80, and that "first shot" can be made in two halves.

The upper half of that "first shot" has a hub portion which has a thin wall that is formed to engage and confine the upper portion of the hub 82 and the upper portions of the inner ends of the spokes 84. Ribs are formed on, and extend upwardly from, the hub portion of the upper half of that "first shot"; and those ribs are generally straight. The spoke portions of the upper half of the "first shot" are denoted by the numeral 98, and they have thin walls and have elongated ribs 100 extending upwardly from those thin walls. The thin-walled spoke portions 98 are formed to engage and confine the upper portions of the remaining lengths of the spokes 84. The rim portion of the upper half of the "first shot" is denoted by the numeral 88, and it has thin walls and elongated ribs 90. That rim portion is formed to engage and confine the upper portion of the rim 86 of the metal core. The elongated ribs 90 extend upwardly from the rim portion and those ribs are circular in plan.

The lower half of the "first shot" also has a thin-walled hub portion which is formed to engage and confine the lower part of the hub 82 and the lower portions of the inner ends of the spokes 84. That hub portion has elongated ribs which extend downwardly from it, and those ribs are generally straight. That lower half of the "first shot" also has thin-walled spoke portions 99 with downwardly extending ribs 101 thereon, and those ribs are elongated and are substantially straight. The spoke portions 99 of the lower half of the "first shot" are formed to engage and confine the lower part of the remaining lengths of the spokes 84. The lower half of the "first shot" has a rim portion 94 which has a thin wall and which has ribs 96 extending downwardly therefrom, and those ribs are circular in plan. The rim portion 94 is formed to engage and confine the lower half of the rim 86.

The principal difference between the halves of the "first shot" of FIGS. 1–5 and the halves of the "first shot" of FIGS. 6–9 and 11 is that the wall portions of the halves of the "first shot" of FIGS. 1–5 are provided with inwardly and outwardly-extending ribs and are provided with openings therein, whereas the wall portions of the halves of the "first shot" of FIGS. 6–9 and 11 have ribs only at the outer faces thereof. The embodiment of FIGS. 1–5 makes it possible to reduce the thicknesses of the ribs to a greater extent than is desirable with the embodiment of FIGS. 6–9 and 11, because the ribs in the former embodiment can be half as long as the ribs in the latter embodiment.

The upper and lower halves of the "first shot" of FIGS. 6–9 and 11 will be suitably formed in cavities in a mold or molds and can then be suitably sealed or "tacked" together to encase the metal core. Thereafter, the "first shot" with its encased metal core can be placed within the mold 104 of FIG. 10. That mold has a matrix 106 with a recess 110 and with other recesses, not shown, that will accommoate the hub portions and the spoke portions of the lower half of the "first shot." That mold also has a patrix 108 with a recess 112 and with other recesses, not shown, that will accommodate the hub portions and the spoke portions of the upper half of the "first shot." The recesses 110 and 112 coact to define a cavity in which the rim portions of the upper and lower halves of the "first shot" are held.

Studs 118 can be pressed into the grooves or recesses intermediate the ribs 90 and 96, and the outer ends of those studs will engage the inner faces of the cavity defined by the recesses 110 and 112. Those studs and other studs set in the grooves or recesses of the hub portions and spoke portions of the "first shot" will suspend the "first shot" and its encased metal core within the cavity in the mold 104. The studs 118 will preferably be made of the same kind of material of which the "second shot" is made and they will preferably have the same color. Furthermore, the outer ends of those studs will preferably be made with sufficiently small cross sections to enable those outer ends to merge with the "second shot" and thus become an unrecognizable part of the finished steering wheel 80.

The matrix 106 is provided with a gate 116 and the patrix 108 is provided with a gate 114; and those gates are opposed while being in alinement. The molten "second shot" material will be introduced simultaneously through the gates 114 and 116, and that material will apply both downward and upward forces to the "first shot." Those forces will tend to cancel each other, and thereby tend to help maintain the "first shot" in its proper position within the cavity defined by the mold 104.

The molten "second shot" material will flow into the grooves and recesses defined by the ribs on the hub portions, the spoke portions and the rim portions of the "first shot" and will fill those grooves and recesses. That molten "second shot" material will then overlie the outer faces of the ribs of the various portions of the "first shot" and completely encase that "first shot." In doing so, that molten "second shot" will cause the studs 118 to merge with it and to provide a smooth and attractive surface for the steering wheel.

Where desired, the "first shot" of FIGS. 6–9 and 11 could be formed as one piece. This could be done by placing the metal core within the mold in which the "first shot" is to be formed, and then injecting the material for that "first shot." The finished "first shot" with its encased metal core would have the same appearance and ribbed exterior that the "first shot" of FIGS. 5–9 and 11 has. The "first shot" could then be placed within the cavity in the mold 104 so the "second shot" could be applied to it.

For economy of manufacture, the "first shots" and the finished steering wheels can be formed at the same time in one large press. Specifically, one or more molds can be mounted in a large press to form the "first shots," and that mold or molds will be supplied with molten material from one injection machine; while a further mold can be mounted in that press to form the finished steering wheels; and that further mold will be supplied with molten material from a second injection machine. During each cycle of operation of that press, a complete "first shot" and a finished steering wheel will be formed—that "first shot" being made into a finished steering wheel during the next cycle of operation of that press.

The wall thicknesses of the various portions of the "first shots" will usually be smaller than the thicknesses of the encasing portions of the "second shots." For example, the thin-walled portions 30 and 31 of FIG. 4 will usually be about sixty-five thousandths of an inch thick while the encasing portion of the "second shot" 54 will usually be about one tenth of an inch thick, the thin-walled portions 36 and 44 of FIG. 3 will usually be about sixty-five thousandths of an inch thick while the encasing portion of the "second shot" 54 will usually be about one tenth of an inch thick, and the thin-walled portions 42 and 48 of FIG. 2 will usually be about forty-five thousandths of an inch thick while the encasing portion of the "second shot" 54 will usually be about sixty thousandths of an inch thick. Similarly, the thin-walled portions 98 and 99 of FIG. 8 will usually be about sixty-five thousandths of an inch thick while the encasing portion of the "second shot" 102 will usually be about one tenth of an inch thick, and the thin-walled portions 88 and 94 of FIG. 7 will usually be about forty-five thousandths of an inch thick while the encasing portion of the "second shot" 102 will usually be about sixty thousandths of an inch thick.

Whereas the drawing and accompanying description have shown and described two preferred embodiments of the present invention, it should be apparent to those skilled in the art that various changes can be made in the form of the invention without affecting the scope thereof.

What I claim is:

1. The method of making a molded steering wheel with a surface that is substantially free of shrinkage marks which comprises:
   (a) forming a first molding of inexpensive plastic material in two closely similar parts,
   (b) forming each of said parts of said first molding so it has recesses therein to accommodate portions of a metal core for said steering wheel,
   (c) forming said parts of said first molding so said parts can completely encase said metal core for said steering wheel,
   (d) forming each of said parts of said first molding with surfaces that are disposed outwardly beyond said metal core and that confront each other and that can be rendered "tacky" to enable said confronting surfaces to be forced into adhering relation with each other,
   (e) forming each of said parts of said first molding with openings therein,
   (f) forming each of said parts of said first molding with elongated ribs projecting outwardly from the outer faces thereof and projecting inwardly from the inner faces thereof to define narrow recesses,
   (g) forming said parts of said first molding with wall thicknesses less than one either of an inch,
   (h) forming said ribs with thicknesses less than the wall thicknesses of said parts of said first molding,
   (i) forming said core-receiving recesses of said parts of said first molding in those ribs which extend inwardly from the inner faces of said parts,
   (j) forming narrow recesses so they are generally parallel to the direction of flow of the fluid material of a second molding and are generally parallel to the spokes and rim of said metal core,
   (k) assembling said parts of said first molding with said metal core and rendering said confronting surfaces on said parts "tacky" and forcing said confronting surfaces into adhering relation,
   (l) rendering a plastic material having an attractive surface and an attractive "feel" fluid and applying said plastic material to said first molding to form a second molding which overlies all external portions of said first molding and of said ribs and which fills said narrow recesses defined by said ribs on said parts of said first molding and which passes through openings in said parts of said first molding to engage and bond to said metal core,
   (m) forming said second molding with wall thicknesses less than one eighth of an inch so said second molding will have a surface that is substantially free of shrinkage marks.

2. The method of making molded steering wheel with a surface that is substantially free of shrinkage marks which comprises:
   (a) forming a first molding of plastic material in two closely similar parts,
   (b) forming each of said parts of said first molding so it has recesses therein to accommodate portions of a metal core for said steering wheel,
   (c) forming said parts of said first molding so said parts can encase said metal core for said steering wheel,
   (d) forming each of said parts of said first molding with surfaces that are disposed outwardly beyond said metal core and that confront each other and that can be rendered "tacky" to enable said confronting surfaces to be forced into adhering relation with each other,
   (e) forming each of said parts of said first molding with openings therein,
   (f) forming each of said parts of said first molding with elongated ribs projecting outwardly from the outer faces thereof to define narrow recesses,
   (g) forming said parts of said first molding with wall thicknesses less than one eighth of an inch,
   (h) forming said ribs with thicknesses less than the will thicknesses of said parts of said first molding,
   (i) forming said narrow recesses so they are generally parallel the direction of flow of said second fluid material of a second molding and are generally parallel to the spokes and rim of said metal core,
   (j) assembling said parts of said first molding with said metal core and rendering said confronting surfaces on said parts "tacky" and forcing said confronting surfaces into adhereing relation,
   (k) rendering a plastic material fluid and applying said plastic material to said "first shot" to form a second molding which overlies all external portions of said first molding and of said ribs and which fills said narrow recesses defined by said ribs on said parts of said first molding and which passes through said openings in said parts of said first molding to engage and bond to said metal core,
   (l) forming said second molding with wall thicknesses less than one eighth of an inch so said second molding will have a surface that is substantially free of shrinkage marks.

3. The method of making a molded steering wheel with a surface that is substantially free of shrinkage marks which comprises:
   (a) forming a first molding of plastic material in two closely similar parts, (b) forming each of said parts of said first molding so it has recesses therein to accommodate portions of a metal core for said steering wheel, (c) forming said parts of said first molding so said parts can encase said metal core for said steering wheel, (d) forming each of said parts of said first molding with elongated ribs projecting outwardly from the outer faces thereof to define narrow recesses, (e) forming said narrow recesses so they are generally parallel to the direction of flow of the fluid material of a second molding, (f) assembling said parts of said first molding with said metal core, (g) rendering a plastic material fluid and applying said plastic material to said first molding to form a second molding which overlies all external portions of said first molding and of said ribs and which fills said narrow recesses defined by said ribs on said parts of said first molding, (h) said second molding having thin walls so the surface thereof is substaintially free of shrinkage marks.

4. The method of making a molded steering wheel with a surface that is substantially free of shrinkage marks which comprises:

(a) forming a first molding of plastic material, (b) forming said first molding to encase said metal core for said steering wheel, (c) forming said first molding with ribs projecting outwardly from the outer faces thereof to define narrow recesses, (d) rendering a plastic material fluid and applying said plastic material to said fiirst molding to form a second molding which overlies all external portions of said first molding and of said ribs and which fills said narrow recesses defined by said ribs, (e) said second molding having thin walls so the surface thereof is substantially free of shrinkage marks.

5. A steering wheel that has a surface which is substantially free of shrinkage marks and that comprises:

(a) a metal core,
(b) a molding which encases said metal core,
(c) and which constitutes a plurality of parts that are "tacked" together,
(d) said parts having elongated ribs thereon which are generally parallel to the spokes and which are generally parallel to the rim of said metal core and which define elongated recesses,
(e) said ribs extending outwardly from the outer faces of said parts and also extending inwardly from said inner faces of said parts,
(f) said inwardly extending ribs defining recesses that accommodates said metal core,
(g) openings in said parts,
(h) a second molding that completely encases the first said molding and said ribs and said metal core and that fills said elongated recesses defined by the ribs on said parts of the first said "first shot" and that fills said openings,
(i) said ribs on said parts of the first said molding coacting with the portions of said second molding which fill the recesses between said elongated ribs to constitute elongated fabricated beams that strengthen said steering wheel,
(j) said parts of the first said molding having wall thicknesses less than one eighth of an inch,
(k) said second molding having wall thicknesses less than one eighth of an inch,
(l) said ribs on said parts of the first said molding having thicknesses less than hte wall thicknesses of said parts.

6. A steering wheel that has a surface which is substantially free of shrinkage marks and that comprises:

(a) metal core,
(b) a molding which encases said metal core,
(c) and which constitutes a plurality of parts that are "tacked" together,
(d) said parts having elongated ribs thereon which are generally parallel to the spokes and which are generall parallel to the rim of said metal core and which define elongated recesses,
(e) said ribs extending outwardly from the outer faces of said parts,
(f) openings in said parts,
(g) a second molding that completely encases the first said molding and said ribs and said metal core and that fills said elongated recesses defined by the ribs on said parts of the first said molding and that fills said openings,
(h) said ribs on said parts of the first said molding coacting with the portions of said second molding which fill the recesses between said elongated ribs to constitute elongated fabricated beams that strengthen said steering wheel,
(i) said parts of the first said molding having wall thicknesses less than one eighth of an inch,
(j) said second molding having wall thicknesses less than one eighth of an inch.

7. A steering wheel that has a surface which is substantially free of shrinkage marks and that comprises:

(a) a metal core,
(b) a molding which encases said metal core,
(c) and which constitutes a plurality of parts,
(d) said parts having ribs thereon which define elongated recesses,
(e) said ribs extending outwardly from the outer faces of said parts and also extending inwardly from said inner faces of said parts,
(f) said inwardly extending ribs defining recesses that accommodate said metal core,
(g) openings in said parts,
(h) a second molding that completely encases the first said molding and said ribs and said metal core and that fills said elongated recesses defined by the ribs on said parts of the first said molding and that fills said openings,
(i) said ribs on said parts of the first said molding coacting with the portions of said second molding which fill the recesses between said elongated ribs to constitute elongated fabricated beams that strengthen said steering wheel,
(j) said second molding having thin walls having a surface which is substantially free of shrinkage marks.

8. A steering wheel that has a surface which is substantially free of shrinkage marks and that comprises:

(a) a metal core,
(b) a molding which encases said metal core,
(c) and which constitutes a plurality of parts that are "tacked" together,
(d) said parts having ribs thereon which define recesses,
(e) said ribs extending outwardly from the outer faces of said parts,
(f) a second molding that completely encases the first said molding and said ribs and said metal core and that fills said recesses defined by the ribs on said parts of the first said molding.
(g) said ribs on said parts of the first said molding coacting with the portions of the second molding which fill the recesses between said ribs to constitute fabricated beams that strengthen said steering wheel,
(h) said parts of the first said molding having wall thicknesses less than one eigth of an inch,
(i) said second molding having wall thicknesses less than one eighth of an inch,
(j) said ribs on said parts of the first said molding having thicknesses less than the wall thicknesses of said parts 9. The method of making a molded steering wheel with a surface that is substantially free of shrinkage marks which comprises:
(a) forming a first molding of plastic material in two closely similar parts,
(b) forming each of said parts of said first molding so it has recesses therein to accommodate portions of a metal core for said steering wheel,
(c) forming said parts of said first molding so said parts can encase said metal core for said steering wheel,
(d) forming each of said parts of said first molding with elongated ribs projecting outwardly from the outer faces thereof to define narrow recesses,
(e) forming said narrow recesses so they are generally parallel to the direction of flow of the fluid material of a second molding,
(f) assembling said parts of said first molding with metal core,
(g) rendering a plastic material fluid and applying said plastic material to said first molding to form a second molding which overlies all external portions of said first molding and of said ribs and which fills said narrow recesses defined by said ribs on said parts of said first molding,
(h) forming said second molding so it has a wall thickness greater than the wall thickness of said first molding.

10. The method of making a molded steering wheel with a surface that is substantially free of shrinkage marks which comprises:
(a) forming a first molding of plastic material,
(b) forming said first molding to encase said metal core for said steering wheel,
(c) forming said first molding with ribs projecting outwardly from the outer faces thereof to define narrow recesses,
(d) rendering a plastic material fluid and applying said plastic material to said first molding to form a second molding which overlies all external portions of said first molding and of said ribs and which fills said narrow recesses defined by said ribs,
(e) forming said first molding with openings therein so said second molding can pass through said openings and bond to said metal core,
(f) said second molding having thin walls so the surface thereof is substantially free of shrinkage marks.

11. The method of making a molded steering wheel with a surface that is substantially free of shrinkage marks which comprises:
(a) forming a first molding of plastic material,
(b) forming said first molding to encase said metal core for said steering wheel,
(c) forming said first molding with ribs projecting outwardly from the outer faces thereof to define narrow recesses,
(d) rendering a plastic material fluid and applying said plastic material to said first molding to form a second molding which overlies all external portions of said first molding and of said ribs and to fill said narrow recesses defined by said ribs,
(e) forming said first molding with wall thicknesses less than one eighth of an inch,
(f) forming said ribs with thicknesses less than the wall thickness of said first molding,
(g) said second molding having thin walls so the surface thereof is substantially free of shrinkage marks.

12. The method of making a molded steering wheel with a surface that is substantially free of shrinkage marks which comprises:
(a) forming a first molding of plastic material,
(b) forming said first molding to encase said metal core for said steering wheel,
(c) forming said first molding with ribs projecting outwardly from the outer faces thereof to define narrow recesses,
(d) mounting said first molding in cavity by means of pins which are made of the same type of material of which a second molding of said steering wheel is made and which have reduced cross section ends that can merge with said the material of said second molding,
(e) rendering the plastic material of said second molding fluid and applying said plastic material to said first molding to form a second molding which overlies all external portions of said first molding and of said ribs and which fills said narrow recesses defined by said ribs and which merges with said reduced cross section ends of said pins.

13. The method of making a molded steering wheel with a surface that is substantially free of shrinkage marks which comprises:
(a) forming a first molding of plastic material,
(b) forming said first molding to encase said metal core for said steering wheel,
(c) forming said first molding with ribs projecting outwardly from the outer faces thereof to define narrow recesses,
(d) mounting said first molding in a cavity by means of pins which can merge with the same type of material of which a second molding of said steering wheel is made,
(e) rendering the plastic material of said second molding fluid and applying said plastic material to said first molding to form a second molding which overlies all external portions of said first molding and of said ribs and which fills said narrow recesses defined by said ribs and that merges with said pins.

14. A molded article that has a surface which is substantially free of shrinkage marks and that comprises:
(a) a metal core,
(b) a molding which encases said metal core,
(c) and which constitutes a plurality of parts,
(d) said parts having ribs thereon which define recesses,
(e) said ribs extending outwardly from the outer faces of said parts,
(f) a second molding that completely encases the first said molding and said ribs and said metal core and that fills said recesses defined by the ribs on said parts of the said first molding,
(g) said ribs on said parts of the first said molding coacting with the portions of said second molding which fill the recesses between said ribs to constitute fabricated beams,
(h) said parts of the first said molding having wall thicknesses less than one eighth of an inch,
(i) said second molding having wall thicknesses less than one eighth of an inch.

15. A molded article that has a surface which is substantially free of shrinkage marks and that comprises
(a) a metal core,
(b) a molding which encases said metal core,
(c) the first said molding having ribs thereon that define recesses,
(d) said ribs extending outwardly from the first said molding,
(e) a second molding that encases the first said molding and said ribs and said metal core and that fills said recesses,
(f) said second molding having wall thicknesses less than one eighth of an inch.

References Cited by the Examiner

UNITED STATES PATENTS

| | | | |
|---|---|---|---|
| 2,657,589 | 11/1953 | Sampson | 74—552 |
| 2,705,816 | 4/1955 | Sampson | 74—552 |
| 2,908,941 | 10/1959 | Sabo et al. | 18—59 |

EARL M. BERBERT, *Primary Examiner.*